United States Patent [19]
Hege

[11] 3,954,282
[45] May 4, 1976

[54] VARIABLE SPEED RECIPROCATING LEVER DRIVE MECHANISM

[75] Inventor: Douglas W. Hege, Huntington Beach, Calif.

[73] Assignee: Hege Advanced Systems Corporation, Huntington Beach, Calif.

[22] Filed: July 15, 1974

[21] Appl. No.: 488,833

[52] U.S. Cl. .................................. 280/251; 74/89.2
[51] Int. Cl.² ........................................ B62M 1/08
[58] Field of Search .......... 280/251, 253, 255, 258; 74/89.2, 89.21, 89.22

[56] References Cited
UNITED STATES PATENTS

| | | | |
|---|---|---|---|
| 636,184 | 10/1899 | Roxendorff | 280/251 X |
| 3,375,023 | 3/1968 | Cox | 280/251 |
| 3,834,733 | 9/1974 | Harris | 280/251 |

FOREIGN PATENTS OR APPLICATIONS

| | | | |
|---|---|---|---|
| 6,583 | 9/1897 | Sweden | 280/251 |
| 17,380 | 6/1900 | United Kingdom | 280/251 |
| 6,582 | 9/1897 | Sweden | 280/251 |
| 7,006 | 7/1898 | Sweden | 280/251 |
| 10,573 | 1/1900 | Sweden | 280/251 |
| 10,578 | 1/1900 | Sweden | 280/251 |

Primary Examiner—Robert R. Song
Assistant Examiner—Terrance L. Siemens
Attorney, Agent, or Firm—Kenyon & Kenyon Reilly Carr & Chapin

[57] ABSTRACT

A pedal drive mechanism for a rider-powered vehicle. In a preferred bicycle version, pedal lever arms are pivotally attached to each side of the frame near the rear wheel hub for reciprocal rotation within a limited angular sector. Downward forces exerted by a rider on the pedals are transmitted through flexible tension members on each side of the bicycle anchored either to first attachment points intermediate the ends of the lever arms or to second attachment points on the frame above the lever arms and leading around pulleys mounted at the other of the first and second points. From the pulleys each tension member leads over and around a corresponding rotary driving member that is connected through an overrunning clutch to the rear wheel. Means interconnecting the lever arms return one arm to the upper starting position while the other arm is in the downward power stroke. Manually operable control means vary the location of the second attachment points with respect to the frame to change the torque delivered to the driving member for a given driving force on the pedals. Additional idler pulleys mounted at the tension member anchor points may be used to "gear up" the mechanism for higher speeds and lower output torque. Disconnect means disengage the overrunning clutches from the rear wheel hub to prevent damage to the mechanism when the bicycle is backed up.

12 Claims, 24 Drawing Figures

VARIABLE SPEED RECIPROCATING LEVER DRIVE MECHANISM

BACKGROUND OF THE INVENTION

1. Field of the Invention

This invention relates to pedal-type drive mechanisms for vehicles such as bicycles and more particularly to vehicle drive mechanisms for converting oscillatory motion of pedal levers to intermittent unidirectional rotation of a driven wheel and including means for continuously varying the speed of rotation of the driven wheel relative to the angular rate of movement of the pedal levers.

2. Description of the Prior Art

The conventional roller chain and sprocket bicycle transmission, driven by a pair of rotary pedal cranks, was designed a century ago and has remained essentially unchanged since then except for the development of various braking and shifting-type speed changing accessories. The basic arrangement of a forward sprocket wheel driven by rotating pedal cranks and coupled by an endless roller chain to a rear sprocket wheel mounted concentrically with the hub of the rear wheel of the bicycle combines the advantages of simplicity and low friction to provide an inexpensive and efficient drive mechanism. This conventional design has at least two inherent drawbacks, however.

For one thing, rotary pedal cranks do not provide a uniformly effective conversion of the substantially linear driving force exerted by the rider into drive torque. At the top and bottom of pedal travel, drive torque is minimal and reaches a maximum value only at the midpoint of downward travel of each pedal. For another thing, the endless chain and tandem sprocket drive does not lend itself to simple continuous speed change mechanisms. For example, two speed change systems in common use are the epicyclic or planetary gear changer developed by J. J. H. Sturmey and J. Archer in the early 1900's and the derailleur, which shifts the chain from one sprocket wheel to another of different size. The Sturmey-Archer type of epicyclic gear changer is very complex and relatively fragile and difficult to maintain in adjustment. The derailleur is a simpler mechanism but requires skill to operate. In addition, since the derailleur mechanism is necessarily mounted in an exposed position next to the rear wheel hub, it is subject to damage from dirt and impact.

Other drive mechanisms for bicycles or similar pedal driven vehicles have been used. One of the earliest bicycle drives, for example, was designed by K. Macmillan about 1839. Macmillan's Hobbyhorse, as it was called, had a pair of pedal levers pivotally suspended from the steering fork tube. Connecting rods extended rearwardly to the ends of crank arms attached to each side of the rear wheel hub, thereby converting oscillatory motion of the pedal levers into rotation of the rear wheel.

A drive mechanism disclosed in U.S. Pat. No. 2,252,156 issued to J. D. Bell on Aug. 12, 1941 combines the oscillating levers and connecting rods of the Macmillan design with a conventional tandem sprocket wheel and roller chain drive. The rear end of the connecting rod is coupled to the forward sprocket wheel through a complex slide and ratchet system for converting the reciprocal linear movement of the connecting rod into intermittent unidirectional rotation of the sprocket wheel.

The American "Star" racing machine, a well known bicycle of the last century, also featured oscillating pedal levers. The levers were pivoted from rear frame extensions behind the rear wheel hub and had pedals at their forward ends pumped in an up-and-down direction by a rider seated above the rear wheel. None of the above described oscillating pedal lever drives, however, had provision for changing the speed ratio, and none has survived in present day bicycle designs, although a slight variant of the Macmillan arrangement is used extensively for pedal drive mechanisms in four-wheeled vehicles for small children.

SUMMARY OF THE INVENTION

The pedal drive mechanism of the present invention eliminates the drawbacks of the prior art designs described above by providing the reciprocal pedal motion best adapted to match the driving force available from the legs of the rider, by concerting this driving force into substantially constant torque to the driven wheel over the full pedal power stroke and by permitting continuously variable output to input speed ratios over a wide range as high as 12:1. Although intended particularly for use in a bicycle, the drive mechanism disclosed in this application is adapted for use in any pedal-driven vehicle including tricycles, pedal cars, paddle wheel boats and the like, as well as for other applications suitable for a drive mechanism to convert reciprocating or oscillating motion into intermittent unidirectional rotation.

In the broadest form, the pedal drive mechanism of the present invention comprises an elongated lever arm pivotally connected to the frame of a vehicle or the like for oscillation within a predetermined angular sector and having means near its free end for receiving a driving force such as may be exerted by a rider on or in the vehicle. The force receiving means will usually be a foot pedal, but in some applications it could be a hand grip or even a crank pin for connection to a reciprocating drive from a motor or engine.

An anchor means is mounted at either one of a first attachment point on the lever arm intermediate the ends thereof or a second attachment point connected to the frame and lying approximately in the plane of oscillation of the lever and spaced to one side of the predetermined sector of oscillation. A rotatable intermediate member is mounted at the other of the first and second attachment points. That is, the anchor means may be mounted at the first attachment point and the rotatable intermediate member mounted at the second attachment point, or vice-versa.

The drive mechanism further includes means for connecting the anchor means to a rotatable driving member by way of the rotatable intermediate member for transforming a tensile force acting on the anchor means along a line from the anchor means tangent to an effective circumference of the intermediate member, in response to a driving force exerted on the force receiving means at the free end of the lever arm, into a force acting on the driving member tangent to an effective circumference thereof (i.e. into a torque tending to rotate the driving member). The driving member, in turn, is coupled through a unidirectional torque transmitting means, such as an overrunning clutch, to a driven wheel of the vehicle or its equivalent.

A preferred embodiment of the means for connecting the anchor means to the rotatable driving member by way of the rotatable intermediate member comprises an elongated flexible tension member, such as a cable, strap, or roller chain. The flexible tension member is attached to the anchor means and leads therefrom around a portion of the effective circumference of the intermediate member, which may be an idler wheel in the form of a pulley, sprocket wheel, or the equivalent. From the intermediate member the flexible tension member leads to and wraps around at least a portion of the circumference of the rotatable driving member in non-slip relation thereto.

If the tension member is a cable or strap, it can be wrapped several times around the driving member, the number of times depending on the maximum stroke of the lever arm, the relative positions of the first and second attachment points, and the circumference of the driving member, and then fastened to the member. This will insure a non-slip relation between the strap or cable and the circumference of the drivng member, while at the same time allowing sufficient length of the strap or cable to unwind from the member to accommodate the maximum stroke of the lever arm. To rewind the cable or strap on the driving member upon the return stroke of the lever arm a biasing means, such as a flat spiral spring, is connected between the driving member and the frame for urging the driving member to maintain tension at all times in the flexible tension member.

If the flexible tension member is a roller chain, on the other hand, the driving member can be a sprocket wheel. In that case the chain and sprocket relation is inherently non-slip. After passing around only a portion of the circumference of the driving member, the end of the chain (leaving enough length to accommodate the full lever arm power stroke) can be connected to the frame through a biasing means, such as a coil spring, that accomplishes the same rewind function as the spiral spring described above.

Instead of using an elongated flexible tension member, an alternative embodiment of the means for connecting the anchor means to the rotatable driving member by way of the rotatable intermediate member comprises an elongated toothed rack pivotally attached at one end to the anchor means and extending tangent to the rotatable intermediate member. The intermediate member and the driving member comprise the input and output gears, respectively, of a gear train. The teeth of the rack mesh with the input gear of the intermediate member so that oscillatory motion of the lever arm relative to the frame induces reciprocal rotation of the driving member.

A major feature of the present drive mechanism is the incorporation of an attachment point connected to the frame (the second attachment point referred to above) and the spatial relation between this attachment point and the attachment point on the lever arm. The relation between the driving force input to the lever arm and the balancing tension force induced along a line between the first and second attachment points is a direct function of the sine of the angle between the lever arm and the line. Changing this angle by moving the location of the second attachment point with respect to the frame will tend to change the output/input force ratio and to change correspondingly the output/input speed ratio.

Consequently, the basic drive mechanism of the invention becomes a variable speed, variable torque, and constant horsepower drive by incorporating means for selectively moving the location of the second attachment point relative to the frame such that the angle between the lever arm and a line from the first to the second attachment point is varied between predetermined values for a given position of the lever arm. Alternatively, variable speed operation can be obtained by incorporating means for selectively moving the location of the lever arm pivot point to cause an equivalent change in the angle between the lever arm and a line between the first and second attachment points.

Finally, the drive mechanism preferably includes means for disengaging the connection between the unidirectional torque transmitting means and the driven wheel when the driven wheel is rotated backwards with respect to the frame. Without such disengagement means the oscillatory drive input system could be forced beyond the predetermined limits when the rear wheel is rotated backwards, with possible resultant damage to the drive system.

A preferred embodiment of such a disengagement means includes shaft means fixed concentrically to the hub of the driven wheel for supporting the unidirectional torque transmitting means for both rotation and axial translation with respect thereto. Means for sliding the unidirectional torque transmitting means along the shaft interconnects the shaft and the unidirectional torque transmitting means in a manner such that forward rotation of the drive member causes the interconnecting means to slide the unidirectional torque transmitting means into engagement with the hub of the driven wheel, and backward rotation of the driven wheel causes the interconnecting means to axially disengage the torque transmitting means from the hub.

The interconnecting means preferably includes a quick nut rotatably connected through a friction coupling to the unidirectional torque transmitting means and a mating threaded portion on the shaft means. Rachet means between the quick nut and the frame of the vehicle allows rotation of the nut in the forward direction but not in the reverse direction. The thread direction of the nut is such as to cause disengagement of the unidirectional torque transmitting means from the hub of the driven wheel when the driven wheel is rotated in the backward direction with respect to the frame. Subsequent forward rotation of the driving member in response to an input driving force on the pedal lever arm drives the quick nut in the opposite direction on the threaded portion of the shaft means, through the unidirectional torque transmitting means and the friction coupling, to reengage the unidirectional torque transmitting means with the hub of the driven wheel.

For simplicity, the drive mechanism of the present invention has been described above in terms of a single lever arm. In a bicycle or similar applications fo the drive mechanism, it is preferable to provide a pair of pedal lever arms, one for each foot of the rider, the lever arms being driven alternately to provide continuous torque delivery to the driven wheel. In such case, the invention further includes means for interconnecting the pair of lever arms for rotating one of the lever arms in a direction to decrease the distance between the corresponding first and second attachment points when the other lever arm is rotated in a direction to increase the distance between its corresponding first and second attachment points.

Accordingly, it is a principal object of the invention to provide a pedal drive mechanism for a vehicle that combines reciprocating pedal motion, for most effective coupling to the driving forces exerted by a rider of the vehicle, with means for converting such driving forces into intermittent unidirectional torque delivered to a driven wheel.

It is a further object of the invention to provide a pedal drive mechanism for a vehicle that includes an oscillating pedal lever arm for receiving input driving forces and means for transforming tensile forces developed in response to said input driving forces, between a first attachment point on the lever arm and a second attachment point connected to the vehicle frame, into intermittent unidirectional torque delivered to a driven wheel.

It is a still further object of the invention to provide a continuously variable speed pedal drive mechanism that includes means for varying the angle between an oscillatory pedal lever arm and a tension member extending between a first attachment point on the lever arm and a second attachment point connected to the vehicle frame for converting tension forces developed in the tension member in response to input driving forces exerted on the pedal lever arm into intermittent unidirectional torque delivered to a driven wheel.

These and other objects of the invention will be apparent from the following description of the preferred embodiments of the invention taken in conjunction with the accompanying drawings.

BRIEF DESCRIPTION OF THE DRAWINGS

FIG. 12 illustrates another embodiment of a speed changing control mechanism.

FIG. 13a is a top view of still another speed changing control mechanism embodiment.

FIG. 13b is a side view of the actuating mechanism of FIG. 13a.

FIG. 14 is a mechanical schematic of a variant of the variable speed mechanism of FIG. 8.

FIG. 15a is still another embodiment of a variable speed mechanism of the invention illustrating the relative position of components in the low speed position.

FIG. 15b illustrates the relative position of components in the high speed position of the embodiment of FIG. 15a.

DESCRIPTION OF THE PREFERRED EMBODIMENTS

The several embodiments of the present invention illustrated in the drawings are all shown as variable speed drive mechanisms for a bicycle because this is the most numerous type of pedal-driven vehicle. It will be apparent from the description, however, that the principle of the invention can be adapted easily to other types of vehicles or drive applications for converting reciprocal or oscillatory motion to intermittent unidirectional rotation.

In the following description, identical or substantially similar components in the several figures will be designated by the same reference numeral for convenience.

Referring to FIGS. 1–4, a preferred embodiment of the drive mechanism is installed in a bicycle having a triangular tube frame that includes a horizontal tube 1, a seat tube 2, and a diagonal tube 3. A front wheel 4 is mounted in conventional steering forks 5 controlled through handlebars 6 by a rider seated on a saddle 7. A rear driven wheel 8 is rotatably mounted at the intersection of a pair of seat stays 9 (only one shown) extending downwardly and rearwardly, one on each side of rear wheel 8, from the upper end of seat tube 2 and a pair of lower stays 10 (only one shown) corresponding to the chain stays of a conventional bicycle and extending rearwardly from the lower end of seat tube 2.

Figures 1, 2, 3:
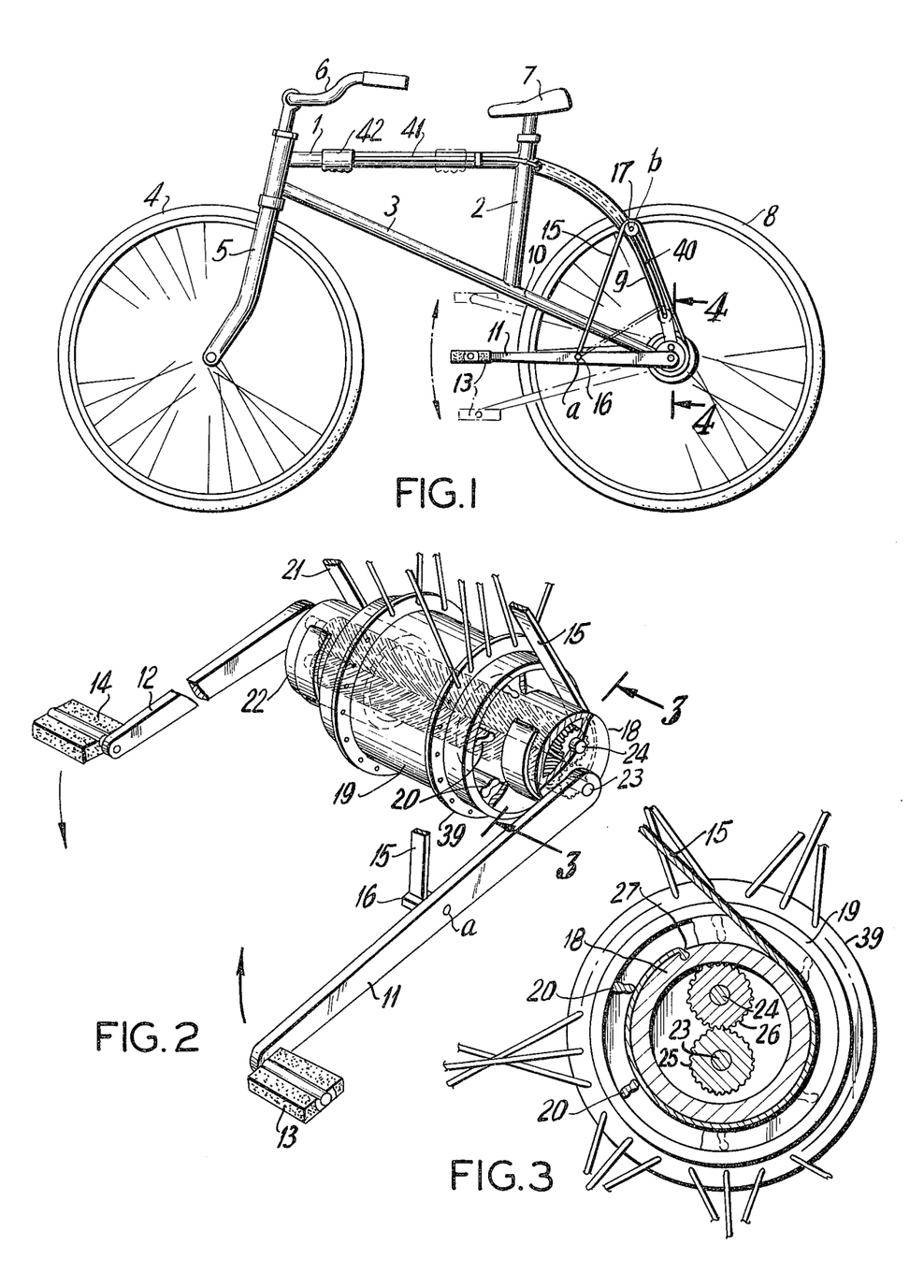
FIG. 1 is a side view of a bicycle incorporating a preferred variable speed embodiment of the pedal drive mechanism of the invention.
FIG. 2 is a simplified perspective view of the major components of the drive mechanism embodiment of FIG. 1.
FIG. 3 is an end view in partial section taken along the lines 3—3 of FIG. 2.

A variable speed drive mechanism for the bicycle preferably includes a pair of lever arms 11 and 12 pivotally mounted at the corresponding intersections of the pairs of stays 9 and 10 for oscillation within a predetermined angular sector, as denoted by the upper and lower limit positions drawn in broken lines in FIG. 1. The two lever arms preferably are interconnected by means to be described so that when left-side lever arm 11 is at the lower limit position, right-side lever arm 12 is at the upper position, and vice-versa. The lever arms have foot pedals 13, 14 attached at their respective forward ends for receiving driving forces exerted by the feet of the rider.

The upper and lower limits of lever arm travel preferably are predetermined as a function of the relative positions of the pedals and saddle for most effective utilization of the rider's leg muscles to produce maximum average driving force for the full stroke of each pedal. Stop means of conventional design (not shown)

preferably are welded or otherwise attached to the bicycle frame for limiting the travel of each lever arm to the angular sector as thus determined.

To transform the downward driving force exerted by the rider on pedal 13 of the left-hand lever arm 11 into forward torque acting on driven wheel 8, an elongated flexible tension member, such as steel strap 15, is fastened at one end to an anchor means 16 mounted at a first attachment point *a* intermediate the ends of lever arm 11. From anchor means 16, strap 15 leads around an idler wheel 17, rotatably mounted at a second attachment point *b* connected to the frame, and thence wraps over and around a rotatable drive member 18 that is connected to hub 19 of wheel 8 through a unidirectional torque transmitting means such as a conventional overrunning clutch incorporating sprags 20. A second flexible strap 21 is attached in identical fashion to lever arm 12 by anchor means (not shown) and leads around an identical idler wheel (not shown) to wrap around a second rotatable driving member 22 on the right-hand side of hub 19. Driving member 21 is also coupled to hub 19 through an overrunning clutch (not shown) for transmitting torque to the hub in the forward direction of rotation.

As mentioned earlier, lever arms 11 and 12 are interconnected so that downward movement of one lever arm causes upward movement of the other. In the embodiment of FIGS. 1–4, the interconnecting means includes a first shaft 23, rotatably mounted in the frame inside and parallel to the rotational axis of hub 19, and a second rotatable shaft 24, also inside hub 19 and parallel to shaft 23. Lever arm 11 is rigidly fastened to the corresponding end of shaft 23, and lever arm 12 is similarly attached to shaft 24. A first gear 25 fastened to shaft 23 meshes with a second gear 26 fastened to shaft 24, so that rotation of shaft 23 in response to downward movement of pedal 13 is translated through gears 25 and 26 into upward movement of pedal 14, and vice-versa.

The operation of this embodiment of the invention may be visualized most clearly by referring to FIG. 2, which shows a simplified perspective view of wheel hub and lever arms with all supporting structure removed. The arrow next to pedal 13 indicates that lever arm 11 is rotating downward, thereby causing shaft 23 to rotate in the forward direction (i.e. counter-clockwise as viewed in the direction of arrows 3—3). Gear 25 rotates with shaft 23; so that meshing gear 26 and its shaft 24 rotate clockwise, thereby causing lever arm 12 to rotate upwards as indicated by the arrow next to pedal 14.

At the same time, downward movement of lever arm 11 draws flexible strap 15 around idler wheel 17 and unwinds the strap from drive member 18. The other end of strap 15 is attached to the circumference of drive member 18 by any convenient means, such as by hooking the other end into an axial slot 27, so that strap 15 is wrapped around member 18 in non-slip relation thereto. Thus, a driving force exerted downward on pedal 13 by the rider creates a tension force in strap 15. This tension force, acting tangent to the circumference of drive member 18, is transformed into a torque tending to rotate drive member 18 in the forward direction. This forward torque, in turn, is transmitted through sprags 20 to hub 19 of the rear wheel, causing the bicycle to move forward.

As pedal 13 moves downward in its power stroke, pedal 14 returns to its upper position to be ready for the alternate driving force delivered by the other foot of the rider. A biasing means (not shown but described below in connection with FIG. 4) is connected between drive member 22 and the bicycle frame for urging the drive member to rotate in the backward direction to rewind strap 21 as lever arm 12 moves toward the upper limit position. When lever arm 11 strikes the lower limit stop, lever arm 12 reaches its upper limit, and the rider shifts his driving effort to the other leg, causing pedal 14 to move downward. Pedal 13 then returns to its upper limit through the action of the interconnecting shafts and gears. The driving cycle is then repeated.

Although the operation has been described in terms of using the full stroke available for each lever arm, it will be readily apparent that the rider can pedal the bicycle with alternating shorter strokes if he so desires. That is, it is not necessary to bring one lever arm all the way to the upper limit before its downward stroke can begin. This feature provides a significant advantage over the conventional rotary pedal crank that has a fixed path of travel. The oscillating lever drive of the present invention allows the rider to change his stroke length as he desires, depending on the bicycle speed and the slope of the terrain.

Figure 4:
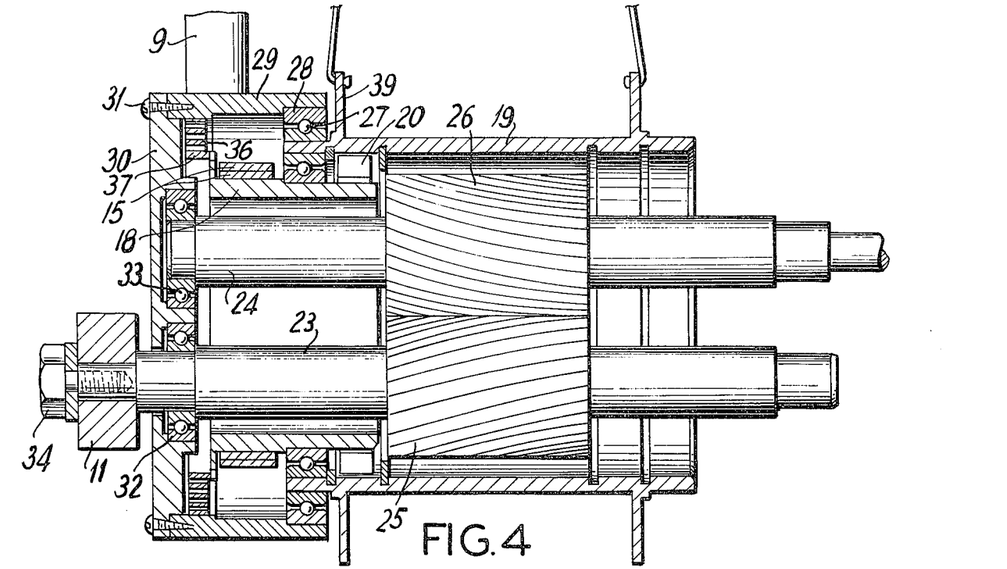
FIG. 4 is a detail drawing in partial section of the driven-wheel hub assembly taken along lines 4—4 of FIG. 1.

The supporting structure for the operative elements of the drive mechanism that are illustrated in FIG. 2 is shown by a cross section drawing in FIG. 4 of the driven wheel hub assembly. Only the left side structure is drawn in detail; the right side is identical to the left but inverted.

Referring to FIG. 4, the outer circumference of the left end of hub 19 is supported for rotation about the hub centerline by a hub support bearing 27 mounted in a counterbored recess 28 of an open cylindrical support housing 29. Housing 29 is attached to the rear ends of left-hand stays 9 and 10 by conventional means such as welding or brazing. A cover plate 30, attached by machine screws 31 to the outer end of housing 29, is bored to receive two bearings 32 and 33 for rotatably supporting the left ends of shafts 23 and 24, respectively.

The left end of shaft 23 extends through cover plate 30, and lever arm 11 is fixedly attached thereto by any suitable means such as a mating square hole and shaft end and a bolt 34.

Cylindrical driving member 18 is supported intermediate its ends in a bearing 35 mounted inside the left end of hub 19 for rotation concentrically with the hub centerline. The inboard end of member 18 forms the inner raceway of the overrunning sprag clutch described earlier, and the outboard end of member 18 is in the form of a flanged drum for carrying the wrapped turns of tension strap 15, the strap being led through an opening (not shown) in the top of housing 29.

As previously described, a biasing means such as a spiral spring 36 is connected between the housing and the flanged end of drive member 18 for rewinding strap 15 on the drum of member 18 as lever arm 11 returns to its upper position after a downward power stroke. The connection of spring 36 between the housing and the drive member may be made in any suitable manner. For example, the outer end of the spring may be hooked and engaged in a longitudinal slot in the housing as illustrated for strap 15 in FIG. 3. The inner end of the spring may be riveted or otherwise fastened to a flat ring 37 having inboard extending protrusions (not shown) meshing with or engaging mating slots in the outer circumference of flange 38 at the outboard end of drive member 18.

A wheel spoke mounting flange 39 extends radially outward from hub 19 and serves the additional function of a dirt seal for bearing 27. Thus, all of the operative elements and support bearings are sealed inside hub 19 and housing 29, yet the drive mechanism can be easily disassembled for repair by removing cover plate 30. It will be appreciated, however, that the present invention is not limited by the specific design of the structure for supporting the operative elements, and many other arrangements could be used without departing from the scope of the invention.

In addition, although the flexible tension member of this first-described embodiment has been shown as a flat steel strap, any equivalent tension member, such as a wire cable, woven nylon strap, chain, and so forth, could be substituted, as desired. Similarly, meshing gears 25 and 26, which are shown as helical gears in FIG. 2, could also be replaced by straight spur gears or herringbone gears.

The variable speed mechanism of the first embodiment, mentioned above, is shown most clearly in FIG. 5. Idler pulley 17 is slidably mounted in a slot 40 extending over a portion of the length of seat stay 9. A flexible control wire 41 capable of transmitting both tension and compression forces is attached at its lower end to idler pulley 17 and at its upper end to a speed control grip 42 mounted on horizontal tube 1 of the bicycle frame within handy reach of the rider.

Control wire 41 is slidably encased for a portion of its length in seat stay 9. Seat stay 9 protects and guides wire 41 so that movement of speed control grip 42 forward (to the left in FIG. 5) draws idler pulley 17 upward towards the top of slot 40. Conversely, pulling speed control grip 42 back to its rearmost position, as shown by the dotted line position in FIG. 5, moves idler pulley 17 to the bottom of slot 40.

It will be understood, of course, that a similar control wire leads from speed control grip 42 to the anchor means for the right-side tension strap so that the speed ratios of both the left and right lever drives are synchronized. In fact, the left and right side drive mechanisms for all the embodiments described and shown herein are essentially mirror images of each other so that in the following discussion only one side mechanism will be described, and it will be understood that the other side operates in the same manner, bearing in mind the differences occasioned by the left and right side mirror image arrangement.

The speed ratio (i.e. the ratio of output wheel speed to input pedalling speed) is controlled by the angle that tension member 15 makes with lever arm 11, this angle being determined by the position of attachment point $b$ in slot 40.

Figures 5, 6A, 6B:
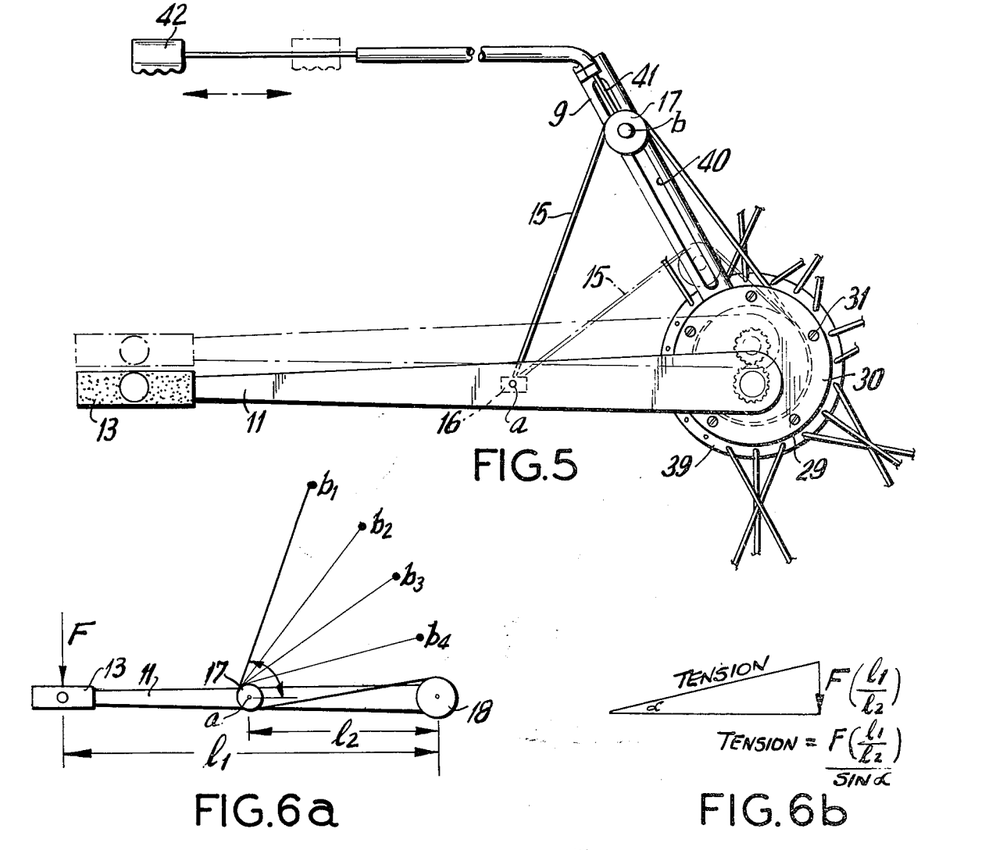
FIG. 5 is a schematic of the drive mechanism of FIG. 1 illustrating the geometric relationships involved in speed changing mechanism.
FIGS. 6a and 6b are force diagrams illustrating the variable speed principle of the invention.

Referring to FIG. 6a, the relation between these factors is illustrated by means of a schematic diagram of the moment forces acting on a pedal lever arm 11. As shown in the figure, lever arm 11 is pivoted about a point $c$ at its right end, and a driving force F is exerted at attachment point $d$ of pedal 13 at the left end of the lever arm. The distance from point $d$ to pivot point $c$ is $l_1$, and the distance from first attachment point $a$ to pivot point $c$ is $l_2$.

FIG. 6 depicts the reverse arrangement of the embodiment of FIGS. 1–5 in which idler wheel or pulley 17 is mounted at attachment point $a$, and the anchor means is located at attachment point $b$. Thus, flexible strap or cable 15 is anchored at attachment point $b$, then passes around and under pulley 17, and thence passes over and wraps around driving wheel 18 which, for simplicity, is shown mounted concentrically with pivot point $c$.

Assuming input force F to be directed normal to the longitudinal axis of the lever arm and referring to the force diagram of FIG. 6b, the relation between the input force F and the tension force T developed in cable 15 can easily be shown to be $$T = (l_1/l_2) \cdot (1/\sin \alpha) \cdot F$$

where $\alpha$ is the approximate angle between the longitudinal axis of the lever arm and the line between points $a$ and $b$.

From equation (1), the torque delivered to drive member 18 becomes $$\text{Torque} = r \cdot T = r (l_1/l_2)(1/\sin \alpha) \cdot F$$

where $r$ is the effective radius of the drive member. Since $l_1$, $l_2$ and $r$ are fixed for a particular drive mechanism, it is evident that the ratio of output torque to input force is an inverse function of $\sin \alpha$.

If the ratio of output torque to input force is defined as the mechanical advantage of the system, it is clear that the ratio of output speed to input speed varies inversely with changes in the mechanical advantage. Thus the speed ratio of the system is a direct function of $\sin \alpha$.

From inspection of FIG. 6a, it can be seen that $\sin \alpha$ decreases as attachment point $b$ is moved progressively from the highest location $b_1$ through intermediate locations $b_2$ and $b_3$ to the lowest point $b_4$. Consequently, the ratio of output speed to input will be highest when attachment point $b$ is at location $b_1$ and will be lowest when point $b$ is at location $b_4$. In this way, the speed ratio may be continuously varied over a wide range.

The foregoing discussion suggests the potential for wide variations in operating characteristics of the drive mechanism of this invention by simple changes in the geometric relation between the lever arm and attachment points $a$ and $b$. To avoid excessive complication, FIG. 6a is limited to only one angular position of the lever arm, but it can be seen that angle $\alpha$ may vary substantially within the upper and lower limits of lever movement.

This potential can be utilized, for example, to provide high mechanical advantage at the upper limit, where the rider's knee is sharply bent and less force can be exerted on the pedal, and then to decrease the mechanical advantage as the pedal moves downward, and more force can be applied to the pedal. Such a characteristic results if point $b$ is located close to the upper limit of travel and slightly offset from point $a$ with respect to distance from the lever pivot point. Then the value of $\sin \alpha$ is quite small when the lever arm is at the upper position, and it increases as the lever arm moves downward. The possibility for tailoring other operating characteristics will be apparent to one skilled in the art.

Figure 7:
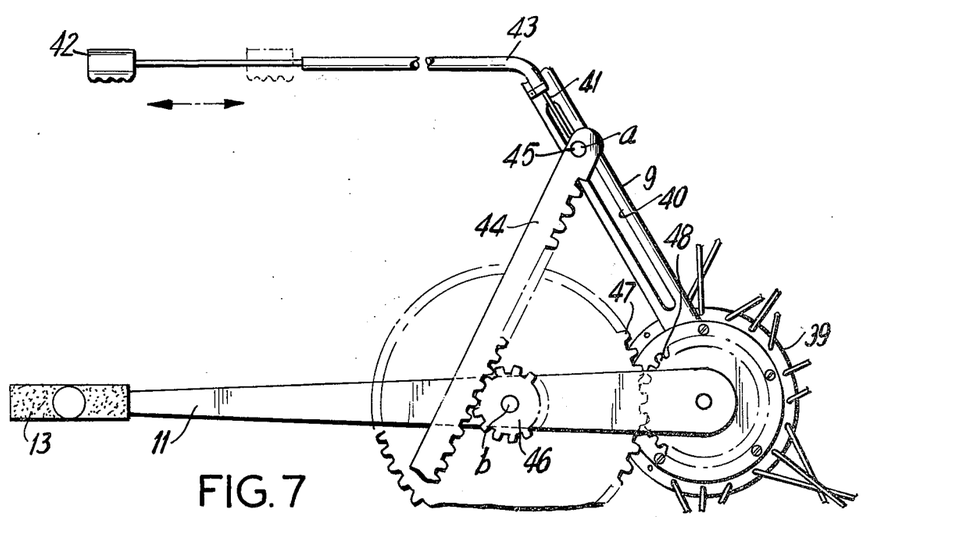
FIG. 7 is a close-up view of an alternative embodiment of the invention.

In the previously described embodiments, the means for transforming the pedal force into torque on the driven wheel comprises a flexible tension member. Referring next to FIG. 7, an alternative embodiment is illustrated in which the means for transforming pedal force into torque includes an elongated toothed rack member 44 pivotally attached at its upper end to an anchor means 45 connected to the bicycle frame at attachment point *b*. Rack member 44 meshes with a gear 46 that is rotatably mounted on lever arm 11 at attachment point *a*. Gear 46, which is functionally equivalent to the idler wheel or pulley of the previous embodiments, is part of a gear train including a second gear 47, mounted on a common shaft and rotating with gear 46, and a geared drive member 48 that is the functional equivalent of drive member 18 in the embodiments described earlier.

Movement of lever arm 11 downward in response to a driving force on pedal 13 causes attachment points *a* and *b* to separate and the rack member to rotate gears 46 and 47 in the clockwise direction. Clockwise rotation of gear 47 in turn rotates meshing gear 48 counterclockwise (i.e. in the forward direction). Geared drive member 48 is connected to the hub of the driven wheel through unidirectional torque transmitting means in exactly the same way as previously described.

On the return stroke of lever arm 11, rack member 44 causes the gear train to rotate in the opposite direction, thereby rewinding member 48 without the need for a biasing spring.

Anchor means 45 is slidably mounted in a slot 40 on seat tube 9 in a manner similar to the mounting of idler pulley 17 in FIG. 5, and a similar speed control lever and cable system allows selective movement of anchor means 45 to provide variable speed ratios in accordance with the analysis developed for FIG. 6. Alternatively, the anchor mounting means of any of the speed control mechanisms to be described below could be substituted, if desired.

Figures 8, 9:
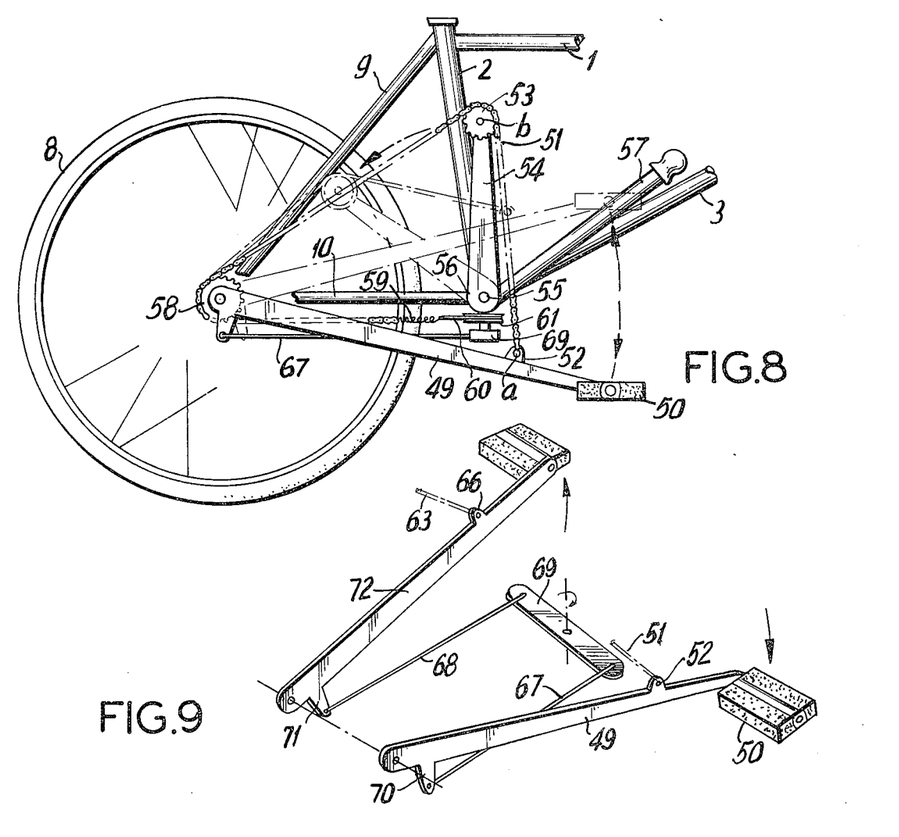
FIG. 8 is a partial side view of a bicycle incorporating an alternative speed-changing embodiment of the invention.
FIG. 9 is a perspective view of the pedal lever arm coordinating mechanism of the embodiment shown in FIG. 8.

FIG. 8 depicts an alternative embodiment of the invention as viewed from the right side of a bicycle. In this version, as previously, a lever arm 49 is pivotally attached to the rear junction of stays 9 and 10 of the bicycle frame and carries a foot pedal 50 mounted at its forward end. A flexible roller chain 51 is attached at one end to attachment means 52 located at first attachment point *a* on the lever arm and then leads around an idler sprocket 53 rotatably mounted at second attachment point *b* located at the upper end of an idler pivot arm 54.

The lower end of idler pivot arm 54 is fixed to a shaft 55 journalled in a hub 56 that forms the lower junction of frame tubes 2 and 3. Hub 56 could be, for example, the pedal crank hub of a conventional bicycle frame. Also fixed to shaft 55 is a speed control arm 57 for manually positioning pivot arm 54 at a plurality of angular positions within a predetermined angular sector, as shown by the forward solid line and rear dashed line positions in the drawing. The limits of this angular sector are determined so as to provide a range of locations for the sprocket wheel corresponding to the speed ratio range desired, as derived from the considerations discussed above in relation to FIG. 6.

After passing around idler sprocket 53, chain 51 leads over and around a portion of a sprocket wheel 58 that forms part of a drive member and clutch combination as previously described. Finally, chain 51 leads forward under sprocket wheel 58 to connect to the rear end of a tension biasing spring 59. The forward end of tension biasing spring 59, in turn, is attached to a flexible cable 60 that passes around a pulley 61 mounted underneath hub 56 for rotation about a substantially vertical axis, although the spring could be attached alternatively to the frame, if desired.

Figures 10, 11:
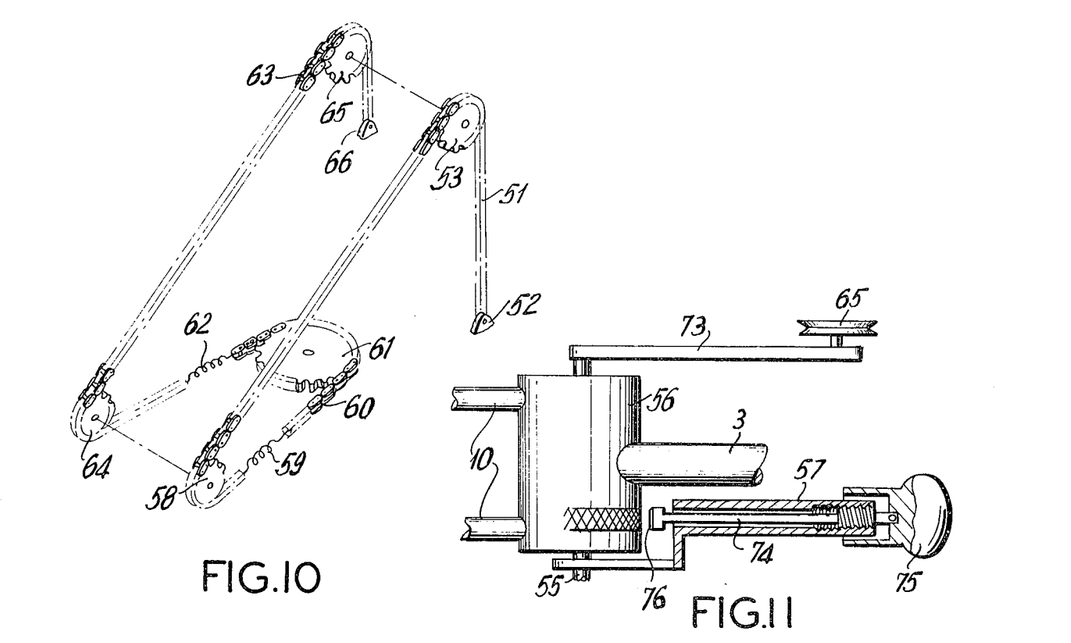
FIG. 10 is a perspective view of the drive chain mounting arrangement of the embodiment of FIG. 8.
FIG. 11 is a view in partial section of one preferred embodiment of a speed changing control mechanism according to the invention.

Cable 60 and pulley 61 may be in the form of a chain and sprocket wheel, as shown in FIG. 10, which illustrates schematically the connection of the other end of cable or chain 60 on the left side of the bicycle to a corresponding bias spring 62 and tension chain 63 leading around a left-hand drive sprocket 64, then forward and over an idler sprocket 65 to terminate at an anchor means 66 mounted on the left-side pedal lever.

Connecting the ends of tension chains 51 and 63 performs the rewind function accomplished by the spiral springs in the first embodiment, and coil springs 59 and 62 accommodate variations in overall length of the chain resulting from changes in the angular position of pivot arm 54.

The embodiment of FIG. 8 also includes an alternative means for interconnecting the right and left-side lever arms, in place of the shafts and meshing gears of the first-described embodiment. As shown more clearly in FIG. 9, this alternative interconnecting means comprises a pair of flexible tension links 67 and 68. The links connect respective outboard ends of a bell crank member 69, mounted under pulley 61 for concentric rotation with respect thereto, to corresponding ears 70 and 71 extending from respective right and left pedal lever arms 49 and 72.

The connection point of tension link 67 to ear 70 is offset from the axis of rotation of lever arm 49 along a line perpendicular to the tension link in a direction such that downward rotation of the lever arm (i.e. in a direction to increase the distance between anchor means 52 and idler sprocket 53) causes tension link 67 to exert a pull on bell crank 69, rotating the bell crank clockwise as viewed from above. Clockwise rotation of bell crank 69 in turn induces tension in link 68, thereby causing lever arm 72 to rotate in the upward direction, as shown.

It will be apparent that the combination of a bell crank and two flexible tension links could be replaced by equivalent means, such as a single flexible tension member connected at its respective ends to ears 70 and 71 and passing around an idler pulley at the location of the bell crank. Either of these or other equivalent versions have the advantage of simplicity and low cost with respect to the shaft and gear interconnecting means, but the latter has the advantage of being totally enclosed.

Although it is not necessary that tension links 67 and 68 be flexible, it is desirable that they be so. Then tension from spring 62 can be sufficient to pull, through chains 63 and 51, both pedals into the top position when the rider's feet are not on them. This allows either pedal to be used first for power when mounting the bicycle and also raises the pedals and arms for storage when the bicycle is not in use, so that it can be laid down without damage to the pedals. Also, if the drive mechanism is not equipped with means for disengaging the overrunning clutch from the rear wheel hub when the bicycle is backed up, the connecting links will be subjected to compression forces that could bend and possibly break them if they are not flexible.

Referring next to FIG. 11, a preferred embodiment of a releasable locking mechanism for the idler sprocket pivot arms is shown in plan view. As described above, shaft 55 is rotatably journalled in hub 56 and carries pivot arm 54 (see FIG. 8) fixed to its right end and a pivot arm 73 fixed to its left end. Also fixed to the shaft is control arm 57.

It is a desirable that the rider be able to change the angular position of the pivot arms by means of control arm 57 with the minimum effort, but it is also necessary that the pivot arms be lockable in the selected position to withstand the strong torques that may be exerted on the pivot arms as a result of the tension in cables or chains 51 and 63 induced by driving forces on the foot pedals. It is also desirable that the releasable locking mechanism operate quickly and simply.

The preferred embodiment in FIG. 11 of a locking means meeting these conditions includes a control arm 57 in the form of a hollow tube internally threaded at its upper end. A locking rod 74 extends through the tube, the rod having a handle grip 75 at its upper end, an enlarged friction tip 76 at its lower end, and an enlarged externally threaded portion near handle grip 75 for mating engagement with the internal threads of the control arm tube.

An arcuate portion of the outer surface of hub 56 is knurled, as shown in FIG. 11, or otherwise provided with a friction surface that lockingly engages the end of enlarged friction tip 76 when handle grip 75 is rotated in a direction to force tip 76 against the hub. To change the angular position of the control arm, the rider twists the handle grip in the opposite direction to release the frictional engagement between tip 75 and hub 56. After moving the control arm to the desired new position, the rider then relocks the arm by twisting the handle grip in the first direction.

Figures 12, 13A, 13B, 14:
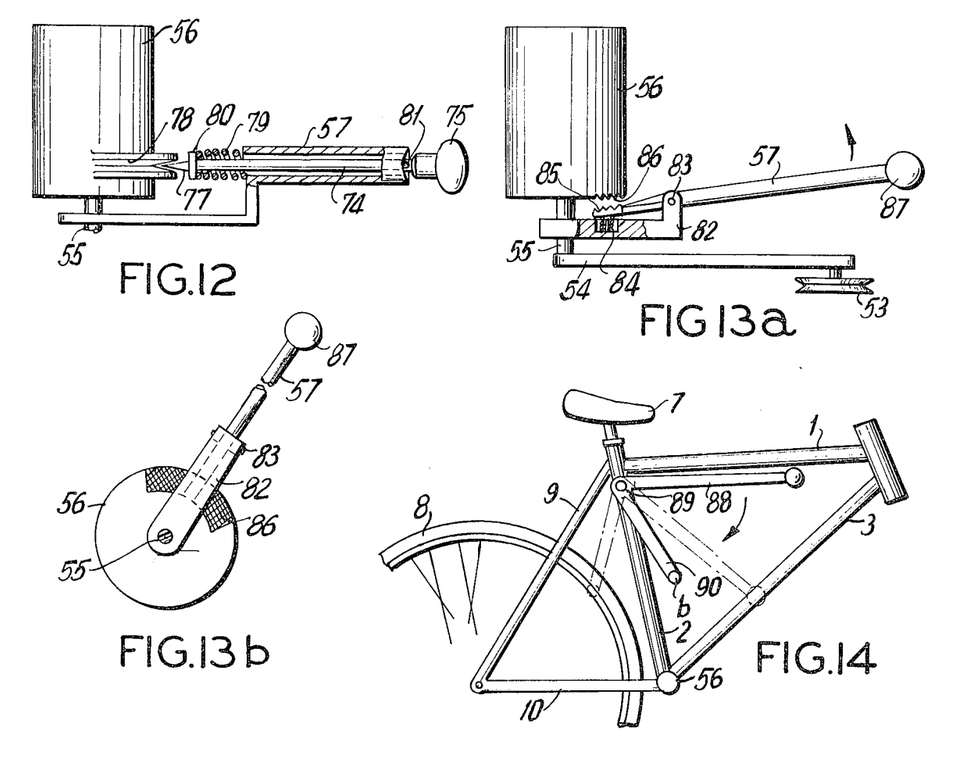

An alternative frictional locking mechanism is shown in FIG. 12, in which locking rod 74 has a pointed tip 77 that frictionally engages a matching V-groove 78 extending around an arcuate portion of the circumference of hub 56. A coil spring 79, compressed between the inner end of tubular control arm 57 and a shouldered portion 80 near the tip of rod 74, urges tip 77 into frictional locking engagement with V-groove 78. The outer end of tubular control arm 57 is contoured in the form of an axial camming surface, and a pin 81 inserted diametrically through rod 74 serves as a cam follower such that rotation of the rod by means of handle grip 75 causes pin 81 to ride up the camming surface and withdraw the tip of rod 74 from locking engagement with the surface of groove 78. The pivot arms can then easily be moved to a new angular position and then, upon releasing the handle, the spring urges the tip of the rod back into locking contact with the groove.

Still another embodiment of a releasably locking pivot arm control means is shown in FIGS. 13a and 13b. In this version, control arm 57 is mounted in an L-bracket 82 by a pin 83 for limited pivoting movement about the axis of the pin in a direction shown by the arrow. The L-bracket has a recess opposite the inner end of control arm 57 for mounting a compression coil spring 84 for urging the end of the control arm into contact with the adjacent side of hub 56. The contacting surface 85 at the end of control arm 57 and a corresponding arcuate portion 86 on the end of hub 56 are knurled or otherwise roughened to provide frictional locking engagement of the two surfaces when pressed together by spring 84.

To operate the embodiment of FIG. 13, the rider merely presses inboard against knob 87 at the end of control arm 57 in the direction shown by the arrow in FIG. 13a to disengage the locking surfaces 85 and 86. After rotating control arm 57 and shaft 55 to a new desired position for the pivot arms 54 and 73, the rider releases knob 87, and compression spring 84 forces locking surfaces 85 and 86 back into frictional engagement.

It will be appreciated that other types of releasable locking arrangements for control arm 57 can be used in place of the embodiments shown, such as conventional mechanisms of the type used for automobile floor-mounted parking brakes. In addition, if more positive locking action is desired than can be provided by the roughened or knurled surfaces of the above-described embodiments, the engaging surfaces can be transversely serrated or comprise a series of slots or holes on hub 56 and a mating tip at the end of locking rod 74 for insertion into the slots or holes.

Referring next to FIG. 14, there is shown a variant of the speed changing mechanism of FIG. 8 in which a control arm 88, mounted for rotation about a hub 89 at the upper end of seat tube 2, controls a pivot arm 90 so as to move attachment point $b$ at the lower end of the pivot arm through a desired range of positions relative to attachment point $a$ on the pedal lever (not shown). The range of movement is illustrated by the solid forward line and dashed rear line positions of FIG. 14. Control arm 88 can be provided with any of the releasable locking mechanisms of FIGS. 11 through 13, as desired. The operation of the embodiment of FIG. 14 is exactly the same as the operation of the embodiment of FIG. 8; the only difference is the change of location of the pivot point of the pivot arm from hub 56 to the top of seat tube 2.

Figures 15A, 15B:
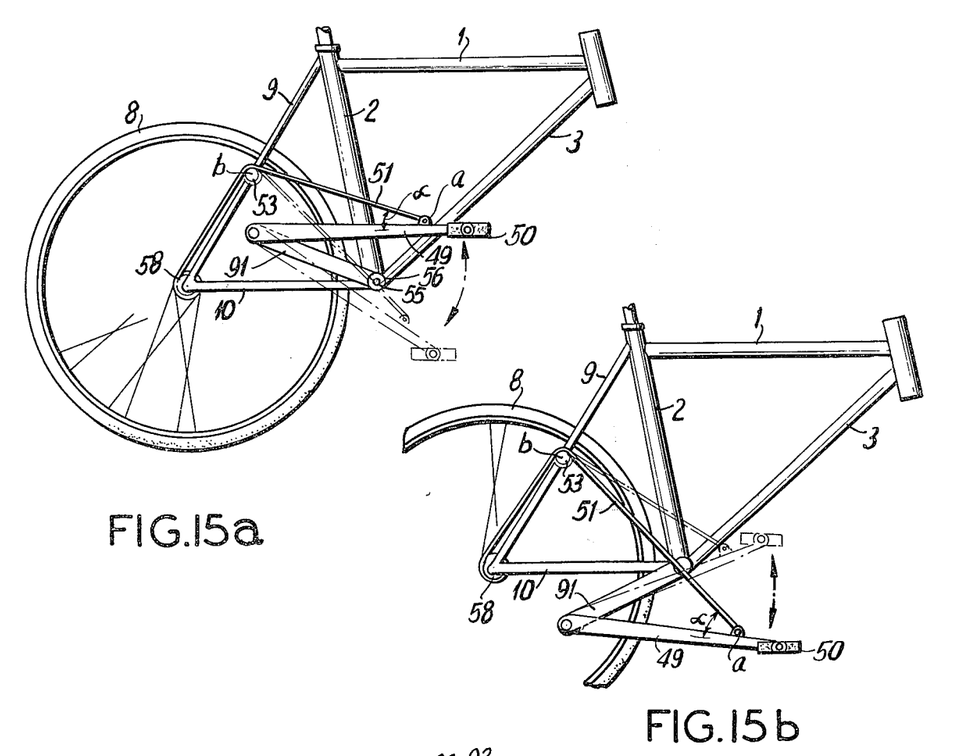

FIGS. 15a and 15b illustrate the upper and lower limit positions of still another speed changing arrangement for providing a variable angle $\alpha$ between the pedal lever and the line between attachment points $a$ and $b$. In this embodiment, pedal lever arm 49 is not attached directly to the bicycle frame. Instead, pedal lever arm 49 is pivoted at its rear end to the rear end of a connecting arm 9L that in turn is rotatably mounted at its forward end to shaft 55 journalled in hub 56. Connecting arm 91 may be rotated between the upper limit position shown in FIG. 15a to the lower limit position shown in FIG. 15b by a control arm (not shown) similar to control arm 57 in FIG. 8.

As can be seen by inspection of FIGS. 15a and 15b, rotation of connecting arm 91 from the upper to the lower limits causes a respective increase in the angle $\alpha$, thereby progressively increasing the ratio of output to input speeds as connecting arm 91 is moved between these two positions. The net effect, therefore, of moving the pivot point of the pedal lever relative to the frame is the same as moving the position of attachment point $b$ relative to attachment point $a$ by any of the previously described mechanisms.

An advantage of the arrangement of FIG. 15 is that less torque is exerted on connecting arm 91 than is encountered by pivot arms 54 or 90 of the embodiments of FIGS. 8 and 14, respectively. Thus, the frictional locking means of FIGS. 11 through 13 should be adequate to hold connecting arm 91 in any desired position between the two limit positions without the need for more positive locking means.

Figures 16, 17:
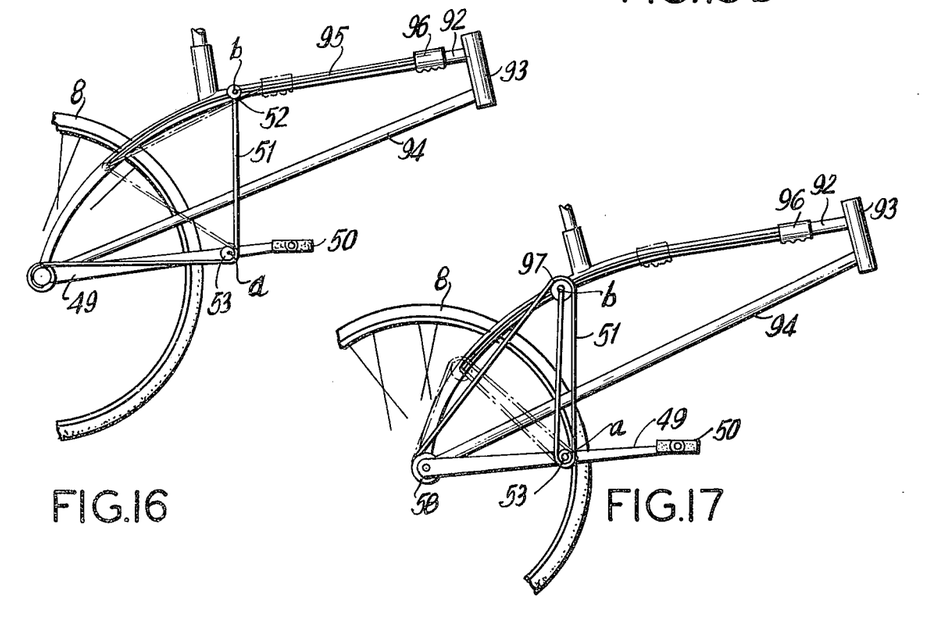
FIG. 16 is a mechanical schematic of still another embodiment of the variable speed drive mechanism of the invention.
FIG. 17 is a mechanical schematic of a multi-stranded "geared up" version of the embodiment of FIG. 16.

Turning next to FIG. 16, an arrangement is shown that is the reverse of the embodiment of FIG. 1. In this embodiment, attachment point $b$ is mounted on a curved upper frame member 92 which extends in an unbroken line from mounting tube 93 for the steering forks (not shown) to intersect a lower frame member 94 at the mounting point of rear wheel 8. Tension line 51 is anchored to attachment point $b$, and idler wheel 53 is mounted at attachment point *a*.

A connecting rod 95 is fastened at its rear end to attachment point *b* and at its forward end to a control handle 96. Control handle 96 is slidably mounted on and releasably engageable with frame member 92 by any suitable conventional means (not shown) to allow the rider to slide handle 96 between the solid and dashed line positions along the frame member, and thereby to move attachment point *b* correspondingly, as shown. From the principles of operation discussed earlier, it can be appreciated that the ratio of rear wheel rotation speed to pedal lever travel speed will progressively decrease as handle 96 is moved from the forward solid line position to the rear dashed line position.

In the embodiment of FIG. 17 the speed control mechanism is identical to that of FIG. 16, but an additional idler wheel 97 has been added at attachment point *b*. Instead of passing directly to drive member 58 after wrapping around first idler wheel 53, tension member 51 is doubled back on itself to pass over idler wheel 97 and then rearwardly to wrap around drive member 58. This arrangement "gears up" the drive mechanism by producing twice the extension of tension member 51 for a given movement of pedal arm 49 as compared with the embodiment of FIG. 16.

This doubles the speed ratio and halves the mechanical advantage for a given relative position between attachment points *a* and *b*. Alternatively, this arrangement allows attachment point *a* to be moved back on lever arm 49 and a corresponding shift to be made in the location of attachment point *b*, so that the entire speed control mechanism is more compact for a given speed ratio and can be made to produce a higher speed ratio. For high speed racing applications, the tension member could be doubled back on itself for any desired number of falls by using multiple-sheave pulleys.

Figures 18, 20, 21:
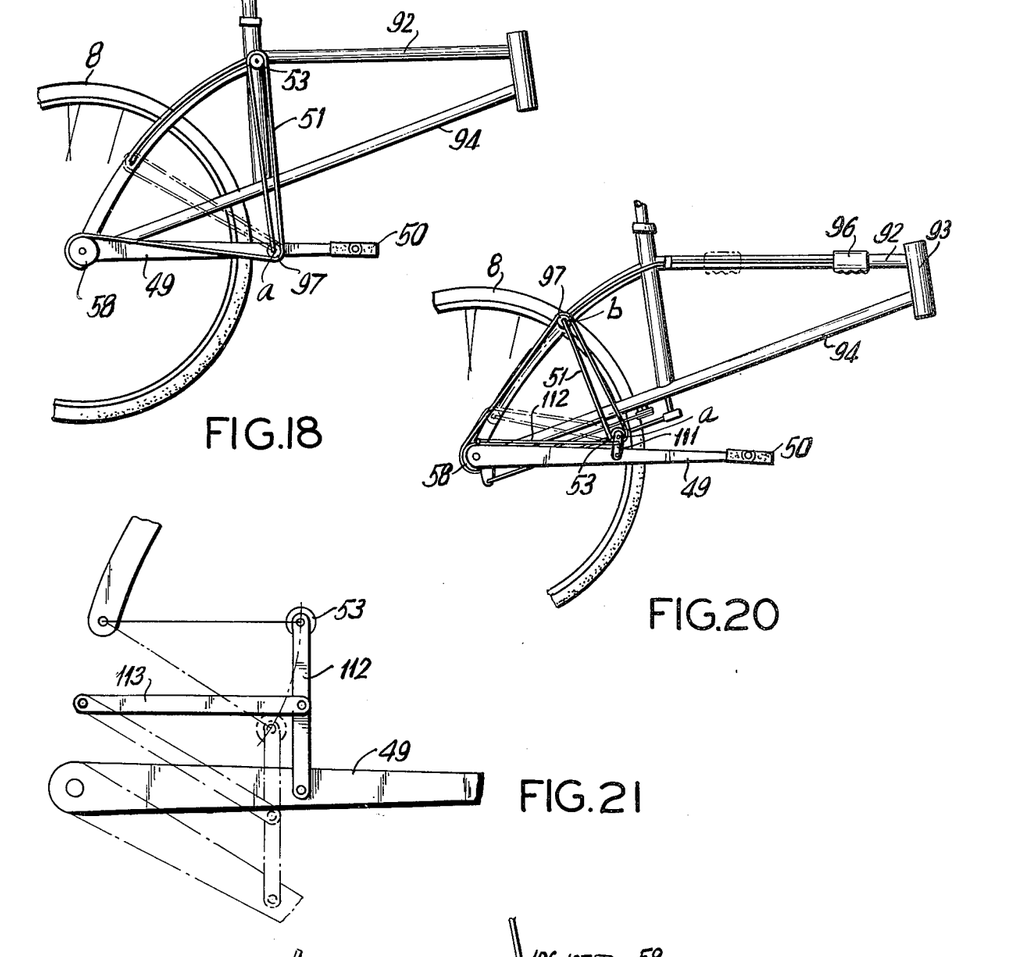
FIG. 18 illustrates a variant of the embodiment of FIG. 17.
FIG. 20 shows a modification of FIG. 17 that incorporates a "false neutral" mechanism.
FIG. 21 is an enlarged view of the false neutral mechanism of FIG. 20.

Referring next to FIG. 18, the speed control mechanism there shown is identical to the arrangement of FIG. 17 except that the positions of idler wheels 53 and 97 have been reversed. The operation of the embodiment of FIG. 18 is in other respects the same as the operation of the embodiment of FIG. 17.

The various speed changing arrangements shown in the above figures demonstrate the design flexibility of the present invention. The geometrical relation common to all the foregoing embodiments is the provision of an attachment point *a* located on the pedal lever arm and an attachment point *b* located at a predetermined point with respect to the bicycle frame, with means for moving attachment point *b* relative to the frame so that an angle $\alpha$ between the lever arm and a line from point *a* to point *b* varies between predetermined minimum and maximum values.

Figure 19:
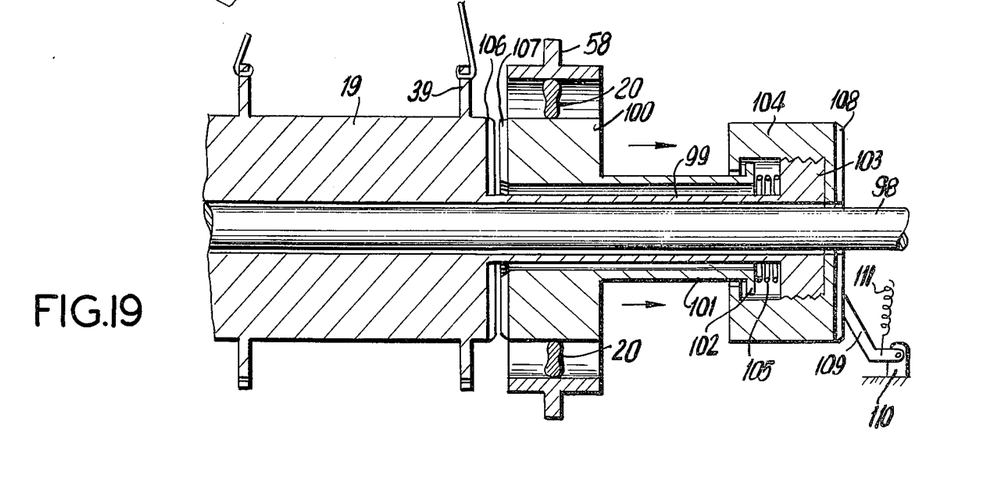
FIG. 19 is a mechanical schematic of a clutch disengagement means to prevent damage to the drive mechanism from reverse rotation of the driven wheel.

It has been mentioned earlier that preferably means should be provided to disengage the unidirectional torque transmitting means from the hub of the driven wheel when the bicycle is backed up, in order to prevent damage to the drive mechanism. A mechanical schematic drawing of a preferred disengagement means is shown in FIG. 19. Referring to this figure, a support shaft 98 is attached at either end (not shown) to the bicycle frame and carries rear wheel hub 19 rotatably mounted thereon. A shaft means 99 extends outboard from each side of hub 19 (only one side is shown; the other side is a mirror image). A unidirectional torque transmitting means, comprising an inner member 100 and a concentric outer drive member such as sprocket wheel 58, is mounted on shaft means 99 for both rotational and axial movement with respect thereto. Sprocket wheel 58 is connected through sprags 20 to inner member 100 for transmitting torque in only the forward direction to the inner member.

Inner member 100 has a cylindrical sleeve 101 extending outboard and terminating in a flanged end 102. Shaft means 99 terminates in an enlarged externally quick-threaded portion 103 which carries a mating quick nut 104 thereon, nut 104 frictionally engaging the flange portion 102 of inner member 100 as a result of axial forces exerted by a compression spring 105 placed between the inboard surface of enlarged portion 103 and the outboard surface of flange 102.

The outboard end of hub 19 and the facing inboard end of inner member 100 have matching radial serrations 106 and 107 that permit torque transmitting engagement when inner member 100 is moved axially into contact with the adjacent end of hub 19. The outboard face of nut 104 carries similar serrations 108 that are engageable by a ratchet dog 109 that is pivotally attached through member 110 to the bicycle frame and biased into engagement with the serrations 108 by a spring 111.

The operation of the drive disengagement mechanism of FIG. 19 is as follows. When the corresponding pedal lever is actuated to rotate sprocket drive member 58 in the forward direction, torque is transmitted through sprags 20 to inner member 100, rotating it also in the forward direction. The rotation of inner member 100 turns nut 104, through the frictional contact with flange 102, on threaded portion 103 of shaft means 99 in a direction to move inner member 100 axially into contact with hub 19. Torque then can be transmitted from inner member 100 through the meshed serrations to hub 19. During such forward rotation, ratchet dog 109 merely clicks against the serrations 108 on the outer face of nut 104.

If hub 19 is rotated in the backward direction, however, as by backing up the bicycle, this rotation is transferred through shaft means 99 to enlarge threaded portion 103. Nut 104 is prevented from rotating with threaded portion 103 by the engagement of ratchet dog 109 with the serrations on the nut. Therefore, portion 103 will rotate inside nut 104, causing the nut to move outboard with respect to shaft means 99, thereby withdrawing inner member 100 axially out of engagement with hub 19 so that member 100 is free to rotate on shaft means 99.

It will be appreciated that a similar disengagement mechanism is mounted on the other side of hub 19. It will also be appreciated that the arrangements of the components in the disengagement means of FIG. 19 is schematic for ease of understanding and that in a practical embodiment the disengagement mechanism would be incorporated in a compact design.

For certain types of operation it may be desirable to have the speed changing mechanism include a neutral point, that is, a condition in which full motion of the pedal arm produces no change in length of the tension member and thus no forward motion of the bicycle.

A true neutral exists when attachment point *b* coincides with the lever arm pivot axis. However, true neutral is difficult to achieve in a practical design because of physical interference and because the distance for movement of attachment point *b* from a reasonable high speed location to the true neutral point demands a long travel for the speed control mechanism.

17

FIGS. 20 and 21 illustrate an embodiment of the invention that includes a false neutral mechanism which allows zero length change in the tension member to be obtained at a location of attachment point *b* that is spaced from the pedal arm pivot axis. At the same time, the mechanism provides a smooth increase in the amount of tension member extension for a given angle of pedal arm travel as a result of movement of attachment point *b* from the zero position to the highest speed position.

The false neutral mechanism comprises a short arm 112 pivotally attached at its lower end to lever arm 49 and carrying rotatable idler pulley 53 at its upper end. A drag link 113 extends between a point near the upper end of arm 112 to a point on the seat stay below the lowest point of travel of attachment point *b*.

As shown more clearly in FIG. 21, oscillatory movement of pedal arm 49 causes attachment point *a* at the axis of pulley 53 to move in an arc centered at the lowest point of travel at attachment point *b*, which thus becomes the zero point or false neutral position. Through the complete range of movement of pedal arm 49 there will be no change in length of tension member 51 when attachment point *b* is in this zero position. On the other hand, the false neutral mechanism has negligible effect on the extension of tension member 51 when attachment point *b* is moved to the high speed position, as shown by the solid lines in FIG. 20, and the speed ratio is continuously variable through all intermediate points.

Although the embodiments illustrated in the drawings and described above demonstrate several design variations and modifications possible within the framework of the invention, it will be apparent to those skilled in the art that other variations may be made without departing from its spirit and scope.

I claim:

1. In a rider-driven vehicle having a frame and at least one driven wheel journalled in the frame for rotation with respect thereto, a variable speed drive mechanism of the type that includes a rotatable driving member mounted for rotation with respect to the frame and having a first predetermined effective circumference;

unidirectional torque transmitting means connected between the driving member and the driven wheel for transmitting torque in only one direction from the driving member to the driven wheel;

an elongated lever arm;

means near one end of the lever arm for receiving a driving force exerted by a rider of the vehicle;

means attached to the lever arm near its other end for connecting the lever arm to the vehicle frame to permit oscillatory movement of the lever arm about its other end within a predetermined angular sector with respect to the frame in response to the driving force exerted by the rider;

anchor means mounted at one of a first attachment point connected to the lever arm intermediate the ends thereof and a second attachment point connected to the frame and lying approximately in the plane of oscillation of the lever arm and spaced to one side of the predetermined sector of oscillation;

a rotatable intermediate member mounted at the other of said first and second attachment points, the intermediate member having a predetermined effect circumference;

18 means for selectively changing the location of the second attachment point relative to the first attachment point for a given angular position of the lever arm so as to vary the angle between the lever arm and a line from the first to the second attachment point for the given angular position of the lever arm between predetermined limits, and means connecting the anchor means to the rotatable driving member by way of the rotatable intermediate member for transforming a tensile force acting on the anchor means along a line from the anchor means tangent to the effective circumference of the rotatable intermediate member, in response to the driving force exerted by the rider on the force receiving means, into a force acting on the driving member tangent to its effective circumference, wherein the improvement comprises:

an arm pivotally attached at one end to a predetermined point on the lever arm intermediate the ends of the lever arm and having the first attachment point located at its other end and a drag link having one end pivotally attached to the arm at a point spaced from the one end of the arm, the drag link extending approximately parallel to the lever arm and having its other end pivotally connected to the frame between the oscillatory axis of the lever arm and the nearest one of the predetermined limits of the means for selectively changing the location of the second attachment point so that the first attachment point describes an arc approximately centered at the location of said predetermined limit in response to oscillation of the lever arm within the predetermined angular sector, whereby the distance between the first and second attachment points remains substantially constant for all positions of the lever arm within said angular sector when the second attachment point is located at said limit position.

2. The drive mechanism of claim 1 wherein the means connecting the anchor means to the rotatable driving member comprises:

an elongated flexible tension member attached to the anchor means and leading therefrom around a portion of the effective circumference of the rotatable intermediate member and thence winding around at least a portion of the effective circumference of the rotatable driving member in non-slip relation thereto, such that rotary movement of the lever arm relative to the frame in a direction to increase the distance between the anchor means and the intermediate member causes the tension member to exert a pull tangential to the effective circumference of the rotatable driving member and thereby rotate said driving member in said one direction for transmitting torque to the driven wheel in response to said rotary movement of the lever arm relative to the frame.

3. The drive mechanism of claim 2 further comprising:

biasing means connected between the frame and the driving member for urging the driving member to rotate in a direction opposite to the one direction in response to angular movement of the lever arm relative to the frame in a direction to decrease the distance between the anchor means and the intermediate member.

4. In a bicycle of the type having a frame, a steerable wheel mounted at the front of the frame, a driven wheel having a hub journalled at the rear of the frame, and a seat for a rider mounted at the top of the frame, an improved variable speed pedal driven mechanism comprising:

a pair of rotatable drive members mounted one on each side of and concentrically with the hub of the driven wheel for rotation with respect to the frame;

a pair of undirectional torque transmitting means connected one between each driving member and the hub of the driven wheel for transmitting torque only in the forward direction from the driving member to the driven wheel;

a pair of elongated lever arms each pivotally mounted near its rear end to the frame, one on each side of and adjacent to the hub of the driven wheel, for reciprocal rotation within a predetermined angular sector having upper and lower limits respectively above and below a horizontal line extending forwardly from the pivot axis of the lever arm;

a pair of pedal means attached one to each lever arm near its forward end for receiving driving forces exerted downwardly by the feet of a rider seated on the bicycle;

a pair of first attachment means connected one to each lever arm intermediate the respective pedal means and pivot axis;

a pair of second attachment means located one on each side of the frame above the upper limit of the predetermined angular sector of reciprocal rotation;

means for selectively changing the location of the second pair of attachment means with respect to the frame so as to vary between predetermined limits the angle between each lever arm and a line between the corresponding first and second attachment means for a given position of the lever arm;

a pair of idler wheels rotatably mounted respectively at one pair of said first and second attachment means;

a pair of elongated flexible tension members, each tension member attached at one end to a respective one of the other pair of said first and second attachment means and leading therefrom around the corresponding idler wheel and thence over and around at least a portion of the circumference of the corresponding driving member in non-slip relation thereto, whereby downward rotation of the corresponding lever arm in response to a driving force exerted by a foot of the rider on the pedal thereof causes the tension member to exert a pull tangential to the corresponding driving member to rotate said driving member in the forward direction, the driving member in turn rotating the driven wheel in the forward direction through the unidirectional torque transmitting means, wherein the improvement comprises:

an arm pivotally attached at one end to a predetermined point on the lever arm intermediate the ends of the lever arm and having the first attachment means located at its other end and a drag link having one end pivotally attached to the arm at a point spaced from the one end of the arm, the drag link extending approximately parallel to the lever arm and having its other end pivotally attached to the frame one of the predetermined limits of movement of the means for selectively changing the location of the second attachment means so that the first attachment means describes an arc approximately centered at the location of said predetermined limit in response to oscillation of the lever arm within the predetermined angular sector, whereby the distance between the first and second attachment means remains substantially constant for all positions of the lever arm within said angular sector when the second attachment means is located at said limit position.

5. The pedal drive mechanism of claim 4 further comprising:

means for interconnecting the pair of lever arms for rotating one of the lever arms toward the upper limit of its predetermined angular sector as the other of said lever arms is rotated toward the lower limit of its angular sector in response to a driving force exerted by the rider on the pedal of said other lever arm.

6. The pedal drive mechanism of claim 5 wherein the means for interconnecting the pair of lever arms comprises:

a bell crank having two equal arms and pivotally mounted at its center to the frame for rotation about an axis lying in the plane of the driven wheel at a location outside the circumference of said wheel and a pair of elongated flexible tension links, each link connected respectively between the end of each arm of the bell crank and a point on the corresponding lever arm that is offset from the axis of rotation of the lever arm along a line that is perpendicular to the tension link such that downward rotation of one lever arm in response to a driving force exerted by the rider on the pedal thereof causes the respective tension link to exert a pull on the bell crank, thereby rotating the bell crank and causing the other tension link to rotate the other lever arm in the upward direction.

7. The pedal drive mechanism of claim 5 further comprising:

biasing means connected between the frame and each driving member for urging the driving member to rotate in the backward direction in opposition to the torque exerted by the corresponding tension member.

8. The pedal drive mechanism of claim 7 wherein each biasing means comprises a spiral spring.

9. The pedal drive mechanism of claim 4 further comprising:

an additional pair of idler wheels rotatably mounted at approximately the location of the other pair of said first and second attachment means, each of said pair of elongated flexible tension members leading from the corresponding first-mentioned idler wheel around the respective additional idler wheel and thence over and around the corresponding drive member.

10. The pedal drive mechanism of claim 4 further comprising:

means for disengaging the connection between the rotary drive members and the hub of the driven wheel when the driven wheel is rotated backwards with respect to the frame.

11. In a bicycle of the type having a frame, a steerable wheel mounted at the front of the frame, a driven wheel having a hub journalled at the rear of the frame, a seat for a rider mounted at the top of the frame, and a variable speed pedal drive mechanism including a pair of rotatable drive members mounted one on each side of and concentrically with the hub of the driven wheel for rotation with respect to the frame;

a pair of unidirectional torque transmitting means connected one between each driving member and the hub of the driven wheel for transmitting torque only in the forward direction from the driving member to the driven wheel;

a pair of elongated lever arms each pivotally mounted near its rear end to the frame, one on each side of and adjacent to the hub of the driven wheel, for reciprocal rotation within a predetermined angular sector having upper and lower limits respectively above and below a horizontal line extending forwardly from the pivot axis of the lever arm;

a pair of pedal means attached one to each lever arm near its forward end for receiving driving forces exerted downwardly by the feet of a rider seated on the bicycle;

a pair of first attachment means connected one to each lever arm intermediate the respective pedal means and pivot axis;

a pair of second attachment means located one on each side of the frame above the upper limit of the predetermined angular sector of reciprocal rotation;

means for selectively changing the location of the second pair of attachment means with respect to the frame so as to vary between predetermined limits the angle between each lever arm and a line between the corresponding first and second attachment means for a given position of the lever arm;

a pair of idler wheels rotatably mounted respectively at one pair of said first and second attachment means;

a pair of elongated flexible tension members, each tension member attached at one end to a respectivie one of the other pair of said first and second attachment means and leading therefrom around the corresponding idler wheel and thence over and around at least a portion of the circumference of the corresponding driving member in non-slip relation thereto, whereby downward rotation of the corresponding lever arm in response to a driving force exerted by a foot of the rider on the pedal thereof causes the tension member to exert a pull tangential to the corresponding driving member to rotate said driving member in the forward direction, the driving member in turn rotating the driven wheel in the forward direction through the unidirectional torque transmitting means; and means for disengaging the connections between the rotary drive members and the hub of the driven wheel when the driven wheel is rotated backwards with respect to the frame, wherein the means for disengaging the connections between the rotary drive members and the hub of the driven wheel comprises:

shaft means fixed concentrically to the hub of the driven wheel and extending outboard from each side thereof for supporting the pair of unidirectional torque transmitting means, one on each side of the hub, for both rotation and axial translation with respect thereto;

means for interconnecting said shaft means and each unidirectional torque transmitting means for sliding each unidirectional torque transmitting means axially inboard into contact with the corresponding side of the driven wheel hub when the driven wheel rotates in the forward direction and for sliding each torque transmitting means axially outboard out of contact with the corresponding side of the driven wheel hub when the driven wheel rotates in the backward direction with respect to the frame, the unidirectional torque transmitting means rotating freely on said shaft means when out of contact with the corresponding side of the hub; and mating engagement means on the contact surfaces of the hub and respective unidirectional torque transmitting means for transmitting torque to the hub in the forward rotational direction when the unidirectional torque transmitting means are in contact with the corresponding sides of the hub.

12. The pedal drive mechanism of claim 11 wherein the means for interconnecting said shaft means and each unidirectional torque transmitting means comprises:

a portion of the shaft means having a quick male thread;

a mating quick-threaded nut engaging the quick-threaded shaft portion;

means for frictionally coupling the nut to the respective unidirectional torque transmitting means, said frictional coupling means permitting limited torque to be transmitted from the coupling means to the unidirectional torque transmitting means; and ratchet means located between the quick nut and the frame of the vehicle for preventing reverse rotation of the nut with respect to the frame, the thread direction being such as to cause disengagement of the respective unidirectional torque transmitting means for the mating engagement means on the hub of the driven wheel when the hub is rotated in the backward direction with respect to the frame.

* * * * *

UNITED STATES PATENT OFFICE
CERTIFICATE OF CORRECTION

Patent No. 3,954,282   Dated May 4, 1976

Inventor(s) Douglas W. Hege

It is certified that error appears in the above-identified patent and that said Letters Patent are hereby corrected as shown below:

Column 17, line 68: delete "effect" and insert --effective--;

Column 19, line 8: delete "undirectional" and insert -- unidirectional--.

Signed and Sealed this

Twentieth Day of July 1976

[SEAL]

Attest:

RUTH C. MASON
Attesting Officer

C. MARSHALL DANN
Commissioner of Patents and Trademarks